Jan. 5, 1971

R. N. HALL ET AL 3,552,180

AUTOMATIC AIR OPERATED FEED UNIT

Filed April 25, 1968

INVENTORS.
RICHARD N. HALL,
JOHN DAHL &
BY GERALD O. HALL

HOOD, JUST, IRISH & LUNDY
ATTORNEYS.

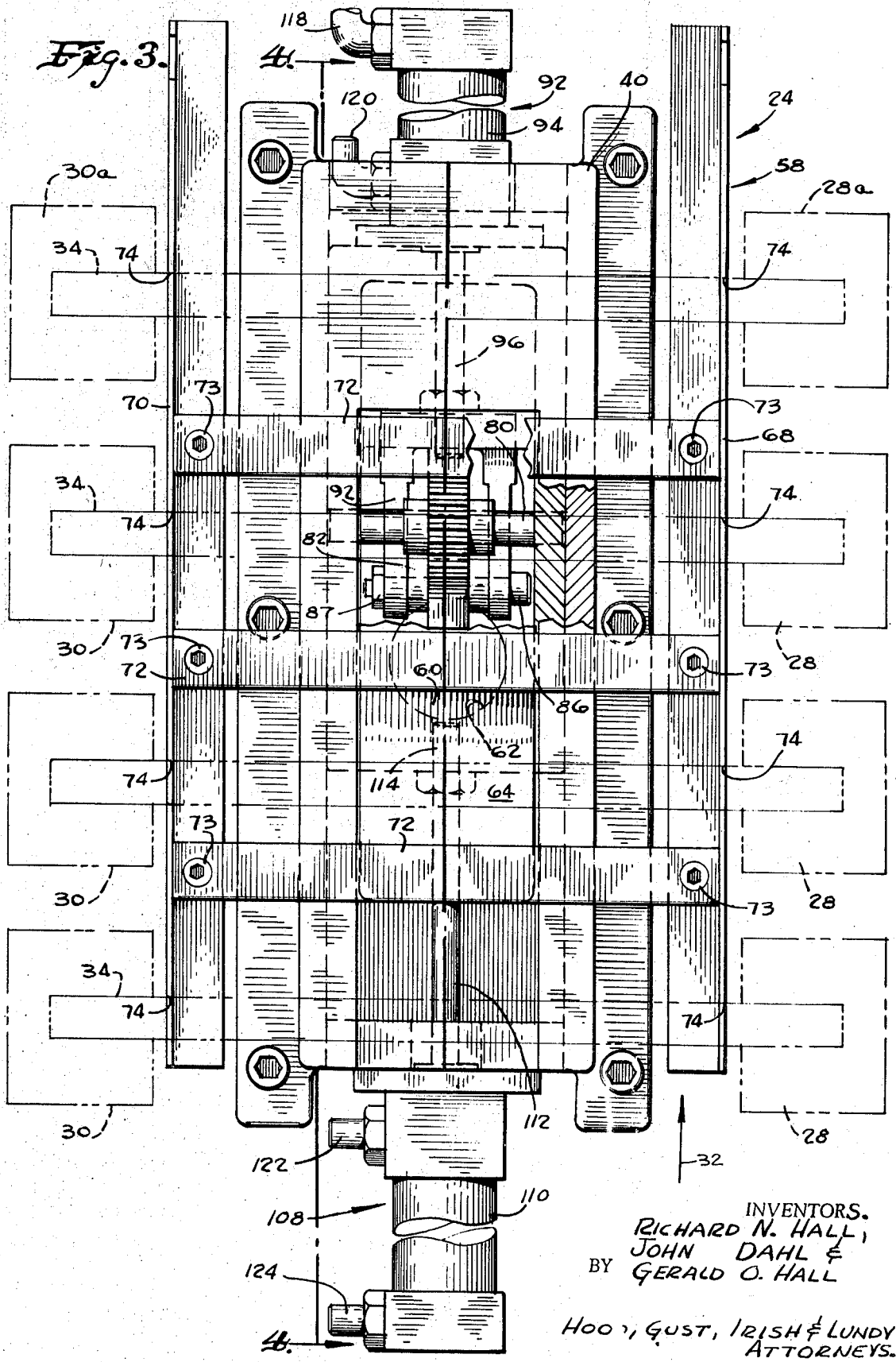

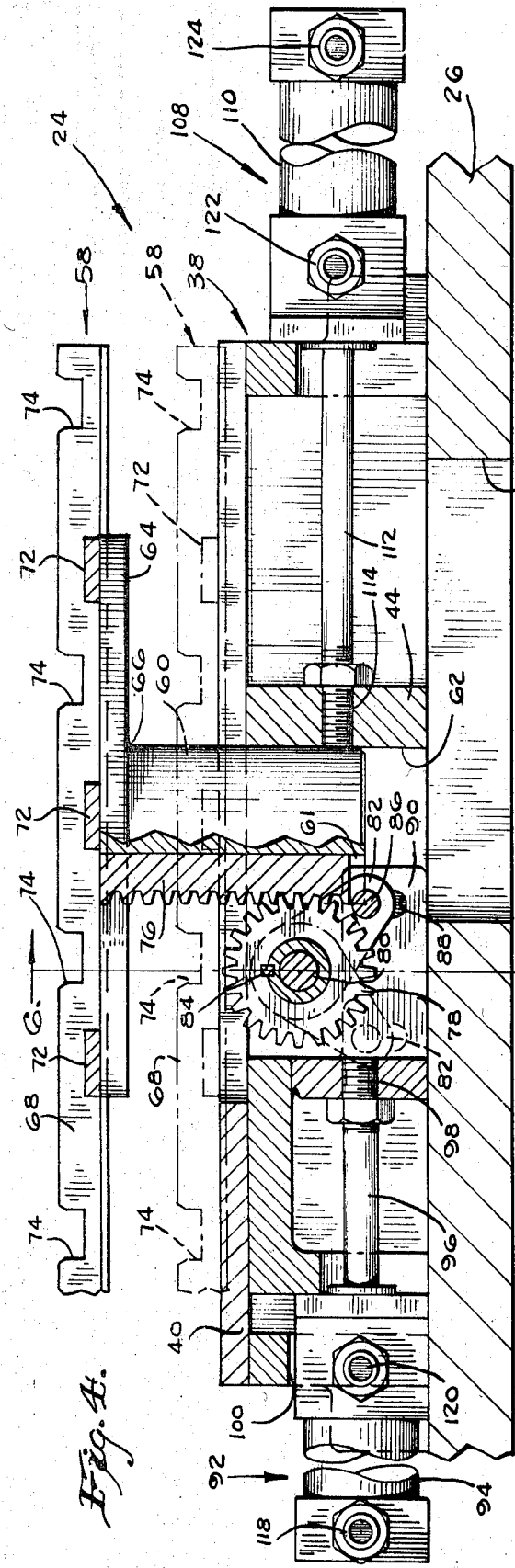
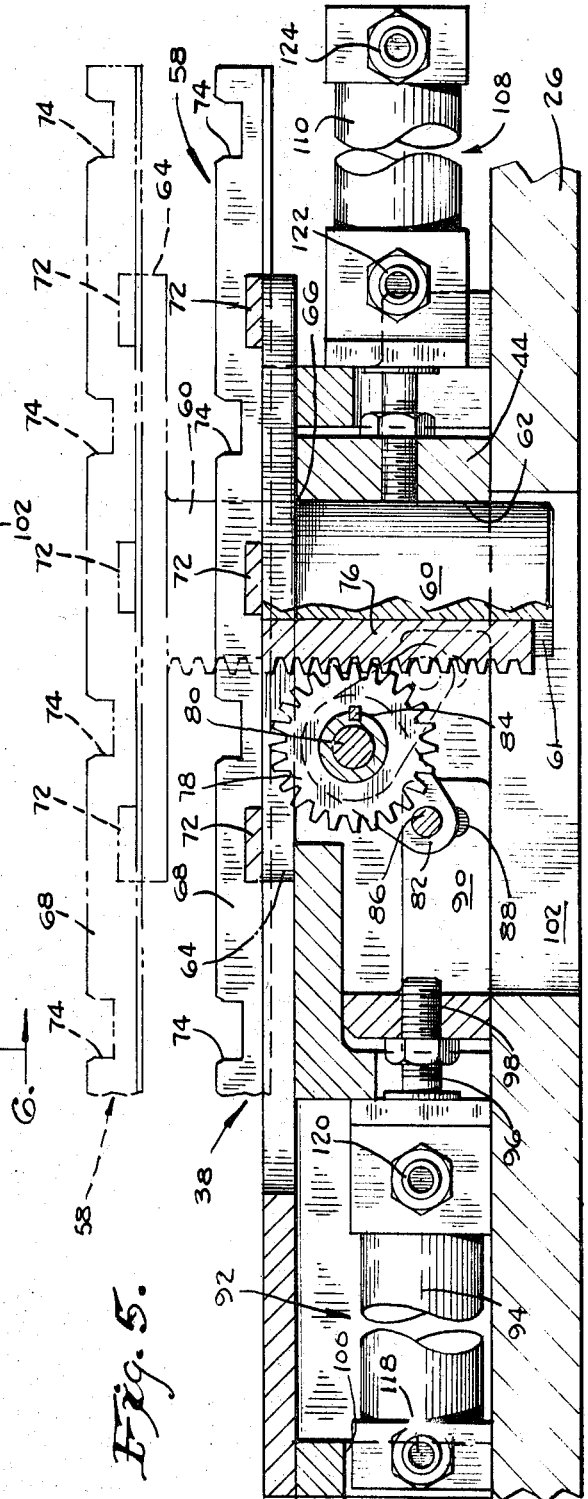

INVENTORS
RICHARD N. HALL,
JOHN DAHL &
BY GERALD O. HALL

HOOD, GUST, IRISH & LUNDY
ATTORNEYS.

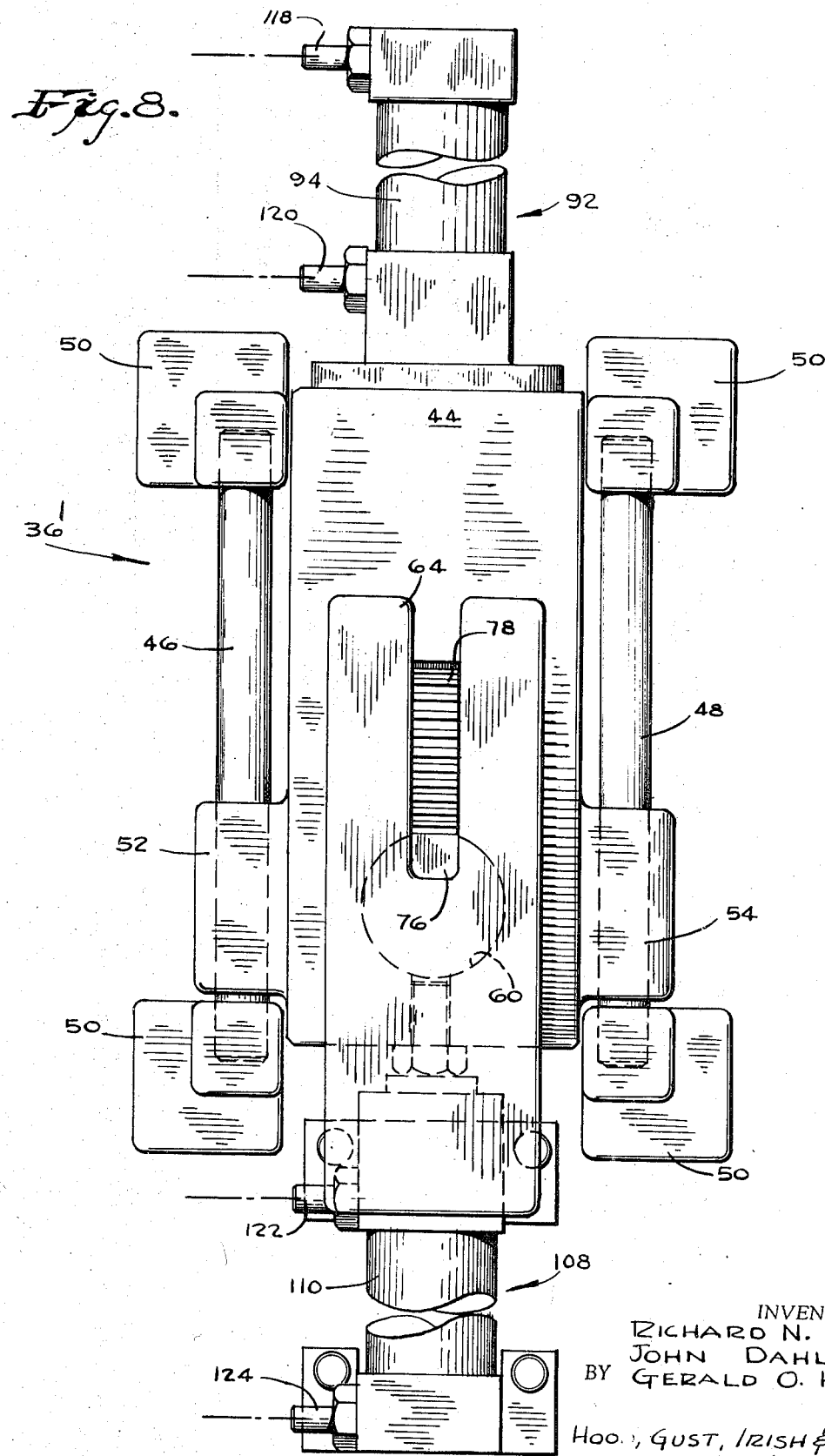

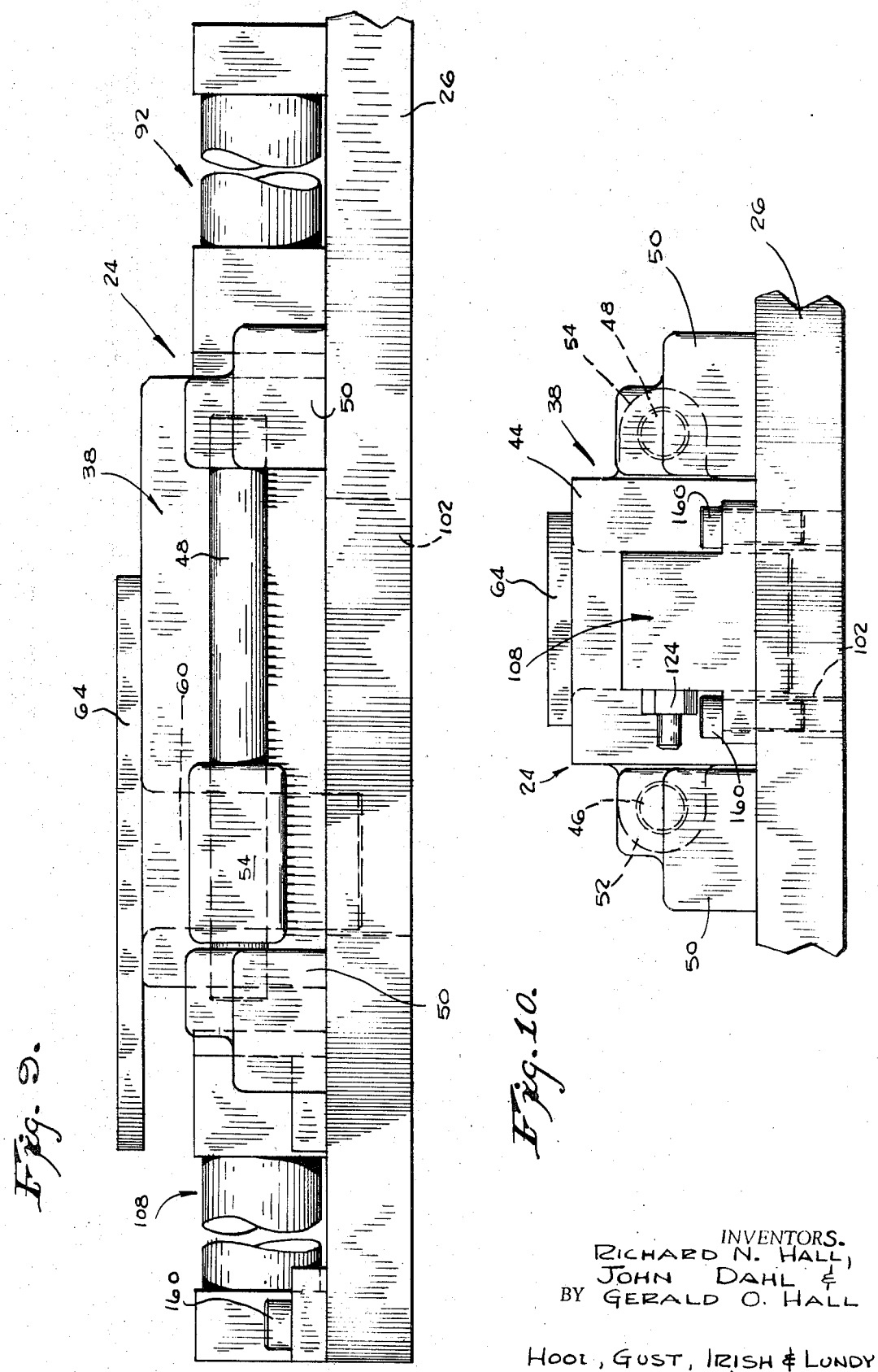

United States Patent Office 3,552,180
Patented Jan. 5, 1971

3,552,180
AUTOMATIC AIR OPERATED FEED UNIT
Richard N. Hall, Greenwood, and John Dahl and Gerald O. Hall, Indianapolis, Ind., assignors to Hall Tool & Engineering, Inc., Indianapolis, Ind., a corporation of Indiana
Filed Apr. 25, 1968, Ser. No. 724,080
Int. Cl. B21d 43/00
U.S. Cl. 72—419          9 Claims

ABSTRACT OF THE DISCLOSURE

For use with a plurality of serially and equally spaced operating stations, such as die stations in a press, means for moving a plurality of workpieces serially through such stations, the moving means comprising guide means arranged to extend alongside such stations, carriage means arranged for reciprocation along the guide means, platform means, means for mounting the platform means on the carriage means for reciprocation in a direction transverse to the guide means, first drive means arranged to reciprocate the carriage means a distance equal to the spacing between such operating stations and second drive means arranged to reciprocate the platform means. The platform means comprises means for supporting such a plurality of workpieces with the spacing between such workpieces being equal to the spacing between such stations. The platform means is disposed so that, when the carriage means is at either end of its travel, each of certain of such workpieces is aligned with one of such stations, and, when the platform means is reciprocated in one direction, such workpieces are engaged thereby and moved away from such stations, and when the platform means is reciprocated in the opposite direction, such workpieces are moved thereby toward and deposited at such stations. Means is provided for controlling the second drive means to reciprocate the platform means in the said one direction when the carriage means is at one end of its travel and in the said opposite direction when the carriage means is at the opposite end of its travel.

---

It is a primary object of our invention to provide an automatic feeder unit for use with a plurality of serially and equally spaced operating stations, such as die stations in a press, the feeder unit being arranged to move a plurality of workpieces serially through such stations.

Our invention is particularly useful with a conventional ram-type press and the control means of our invention can conveniently be operatively connected to the driving means for the ram of such a press. The specific manner in which we arrange our control means will be discussed hereinafter.

Our feeder unit comprises platform means arranged to support a plurality of workpieces with the spacing between such workpieces being equal to the spacing between the operating stations with which our unit is associated. The platform means is continually moved through a closed loop path so that each such workpiece is picked up from one station and moved to an adjacent station each time the platform means is moved through such a path. Preferably, the platform means is mounted on a carriage means for generally vertical reciprocation relative to said carriage means, and the carriage means is mounted on guide means for generally horizontal reciprocation so that this closed-loop path is generally rectangular. Such workpieces are engaged and removed from the stations when the platform means moves upwardly and are deposited at adjacent stations when the platform means moves downwardly. The platform means is reciprocated by a drive means which is controlled so that the platform means will move upwardly when the carriage means is at one end of its path and downwardly when the carriage means is at the opposite end of its path.

It is another object of our invention to provide a first fluid motor for reciprocating such a carriage means a distance equal to the spacing between such operating stations, a second fluid motor for reciprocating the platform means, and valve means arranged to control the fluid motors. We have found that, when we use our unit with a ram-type press, it is convenient to operate such valve means with cam means mounted on the conventional rotary drive means for the ram.

Other objects and features of our invention will become apparent as this description progresses.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 3 is an enlarged plan view of our feeder unit disposed between two rows of die stations, the die stations being shown in phantom for convenience;

FIG. 4 is a reversed sectional view taken from FIG. 3 generally along the line 4—4;

FIG. 5 is a sectional view taken along the same line as FIG. 4, but showing the carriage means at the opposite end of its path and the platform means in its lower position;

FIG. 8 is a plan view of another embodiment of our invention wherein the carriage means is mounted for reciprocation on a pair of spaced apart, parallel bars;

FIG. 9 is a side elevation view of the feeder shown in FIG. 8; and

FIG. 10 is an end view taken from the left-hand side of FIG. 8.

Figure 1:
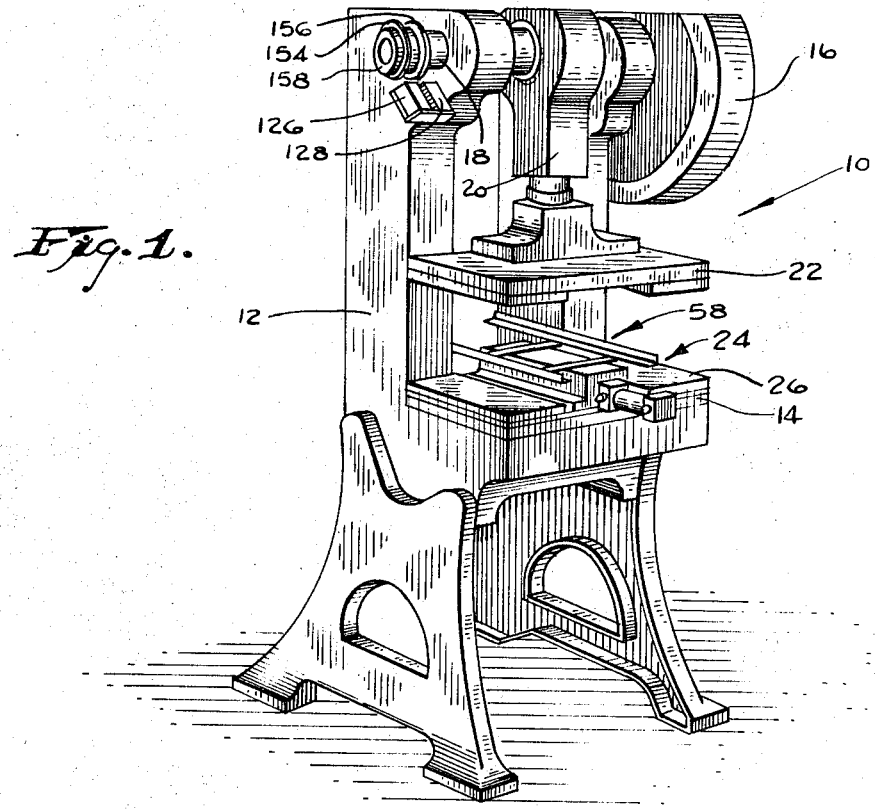
FIG. 1 is a fragmentary perspective view of a conventional press and showing our feeder unit mounted on the bolster of the press.
Figure 2:
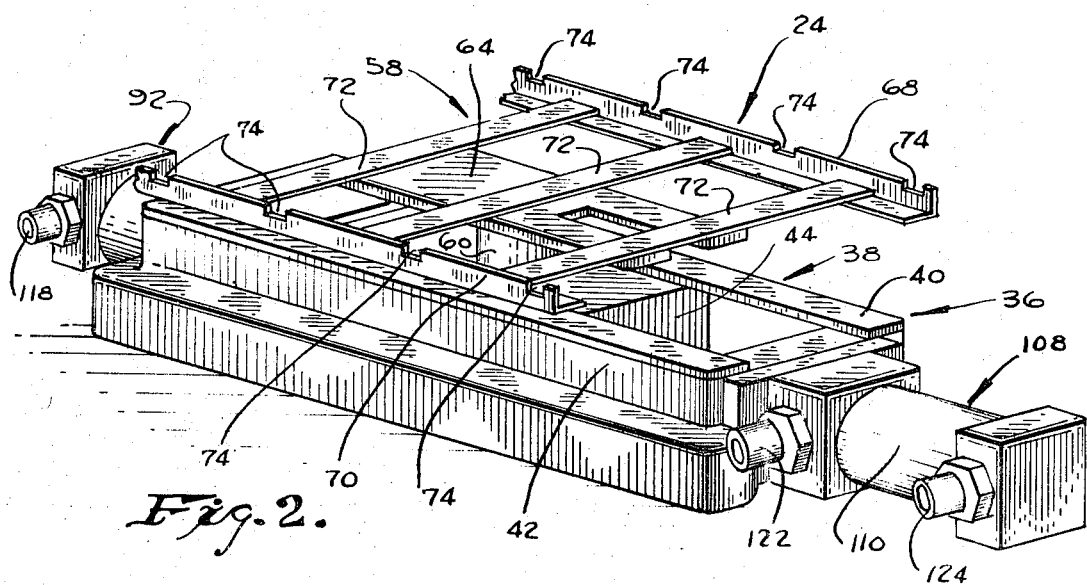
FIG. 2 is a perspective view of one embodiment of our feeder unit.

Referring now to FIG. 1, it will be seen that we have illustrated a conventional press 10 comprising a frame 12, a bolster plate 14 having a generally horizontal upper surface and mounted on the frame 12, a flywheel 16 and a crank shaft 18 journalled for rotation on the upper portion of the frame 12, a ram 20, the upper portion of which is journalled on the eccentric poriton of the shaft 18, and a plate 22, commonly referred to as an "upper die shoe," mounted on the lower end of the ram 20 and arranged for vertical reciprocation relative to the bolster plate 14. Conventionally, metal forming dies are mounted on the plate 14 and arranged to be engaged and operated by movement of the plate 22 as it moves toward and away from the plate 14. As stated previously, the structure of such presses is conventional and well known and need not be discussed, in detail, in this description.

We show our feeder, indicated generally by the reference numeral 24, mounted on a plate 26, commonly referred to as a "lower die shoe," which is, in turn, mounted on the plate 14. As will be discussed hereinafter, we prefer to mount our assembly 24 and the several die stations associated therewith on such a plate 26 so that the feeder and die stations can be assembled as a unit onto the press 10. Thus, we can accurately position the die stations relative to the feeder 24, i.e., make the necessary adjustments so that work pieces can be fed serially through the die stations, thereby to save set-up time.

Die stations or metal forming dies of the type conventionally used with presses are also well known and need not be discussed, in detail, in this description. It will suffice to say that such die stations usually comprise a female portion for receiving a portion of the workpiece and a male portion arranged to engage and form the workpiece while it is in the female portion.

Figure 6:
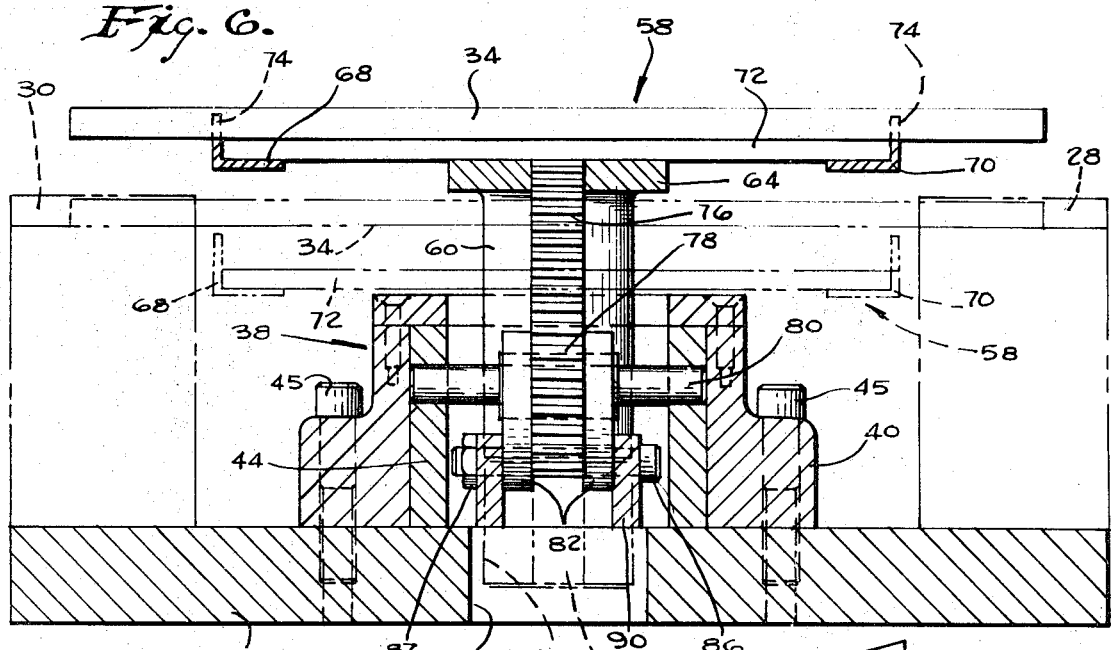
FIG. 6 is a sectional view taken from FIG. 4 generally along the line 6—6.

In FIGS. 3 and 6, we show a row of die stations 28 along one side of our feeder 24 and another row of die stations 30 along the other side of our feeder, the die stations being shown in phantom as a matter of convenience. The spacing between adjacent die stations 28, 30 is equal and, in the illustrative embodiment, each die station 28 is aligned with a die station 30. Specifically, the die stations 28 are arranged serially to perform successive operations on one end of a workpiece while the die stations 30 are arranged serially to perform successive operations on the opposite end of such workpieces. Our feeder 24 is arranged to move such workpieces serially in the direction of the arrow 32 (FIG. 3) through the stations 28, 30. We have shown a broken-line illustration of a workpiece 34 extending between each aligned pair of die stations 28, 30 in FIG. 3. There is a solid-line drawing and a broken-line drawing of such a workpiece in FIG. 6.

Our feeder 24 comprises guide means arranged to extend generally parallel to and between the two rows of die stations 28, 30. In the embodiment of FIGS. 2–6, the guide means, indicated generally by the reference numeral 36 in FIG. 2, comprises a frame 38 arranged to be mounted on the plate 26 as clearly shown in FIGS. 4 and 5, the frame 38 comprising side portions 40, 42 defining, with the plate 26, a trackway in which a carriage means 44 is reciprocably disposed. In FIG. 6, we show the frame 38 secured to the plate 26 by means of screws 45.

In the embodiment of FIGS. 8, 9 and 10, the guide means 36' comprises a pair of parallel, spaced apart bars 46, 48, each of which is supported at its ends by blocks 50 which are adapted to be mounted on and secured to the plate 26. The carriage means 44 of this embodiment (FIGS. 8, 9 and 10) comprises a portion 52, 54 arranged slidably to engage each bar 46, 48. Thus, the bars 46, 48 and the blocks 50 are the equivalent of the frame 38.

Our preferred drive means for reciprocating the carriage means 44 comprises a fluid motor 108 mounted on the frame 38 and operatively connected to the carriage means, the illustrative fluid motor 108 comprising a cylinder 110 from which a piston rod 112 extends. The distal end 114 of the piston rod 112 is threaded into an opening in the carriage means 44 as clearly seen in FIGS. 4 and 5.

We have mounted a platform means, indicated generally by the reference numeral 58, on the carriage means 44 for generally vertical reciprocation relative to said carriage means. In the illustrative embodiment, this platform means 58 comprises a cylindrical post 60 disposed for vertical reciprocation in a part-cylindrical cavity 62 in the carriage means 44 (best seen in FIGS. 3, 4 and 5) and a mounting plate 64 welded or otherwise securely fastened to the upper end of the post 60 as indicated at 66. Mounted on the plate 64 is a rack assembly comprising horizontally and parallel extending side support members 68, 70 which are connected together by three laterally extending members 72. Preferably, the support members 68, 70 and the members 72 will be securely fastened together by means such as the illustrated screws 73 (FIG. 3) and the members 72 will be removably fastened to the plate 64 by means such as screws (not shown). Each support member 68, 70 is formed with a plurality of upwardly opening cut outs 74 for receiving end portions of the workpieces 34. Referring to FIG. 3, it will be seen that the spacing between adjacent cut outs 74 on each member 68, 70 is equal to the spacing between the die stations 28, 30 and that each cut out 74 in one member 68, 70 is aligned with a cut out 74 in the other member. Specifically, a workpiece 34 having its end portions received in such an aligned pair of cut outs 74 will, when the carriage means 44 is at one end of its travel, be in alignment with, and its end portions will extend into an aligned pair of, die stations 28, 30.

Our preferred drive means for reciprocating the post 60 comprises a rack 76 extending along the post and secured thereto and a pinion gear 78 journalled on the carriage means 44 by means of an axle 80, the pinion gear 78 being meshed with the rack 76 as clearly seen in FIGS. 4 and 5. In the illustrative embodiment, a longitudinally extending slot 61 is formed in the post 60 and the rack 76 is placed in the slot. A radially extending arm 82 is disposed on each side of the rack gear 78 and drivingly connected thereto by means such as the illustrated key 84, these arms 82 being clearly seen in FIGS. 3–6. A bolt 86, which is generally parallel with the axle 80, extends through aligned openings in the distal ends of the arm 82. Each end of the bolt 86 is received in a vertically elongated slot 88 in a slider block 90 disposed within the carriage 44 and longitudinally reciprocable relative thereto. Thus, when the slider block 90 is so reciprocated, the rack gear 78 is rocked about its axis to reciprocate the rack 76. The vertically elongated slots 88 permit the bolt 86 to move through an arc while the slider block 90 moves on the flat surface of the bolster plate 26. A nut 87 is threaded onto the lefthand end (FIGS. 3 and 6) of the bolt 86.

We prefer to reciprocate the slider block 90 with a fluid motor, indicated generally by the reference numeral 92, which is mounted on the carriage means 44 for movement therewith, the illustrative fluid motor 92 comprising a cylider 94 from which a piston rod 96 extends. The distal end portion 98 of the rod 96 is threaded into an opening in the slider block 90. The frame 38 is formed with an opening 100 to accommodate movement of the fluid motor 92 with the carriage means 44.

The plate 26 is provided with an elongated opening 102 which receives the lower end of the post 60 and rack 76 when the platform means 58 is in its lower position.

The fluid motors 92, 108 may be conventional, double-acting air cylinders so that the feeder 24 can be operated by connecting it to a conventional compressed air source in a factory.

It will be seen that the cylinder 94 is provided with ports 118, 120 at its ends and that the cylinder 110 is provided with ports 122, 124 at its ends.

Figure 7:
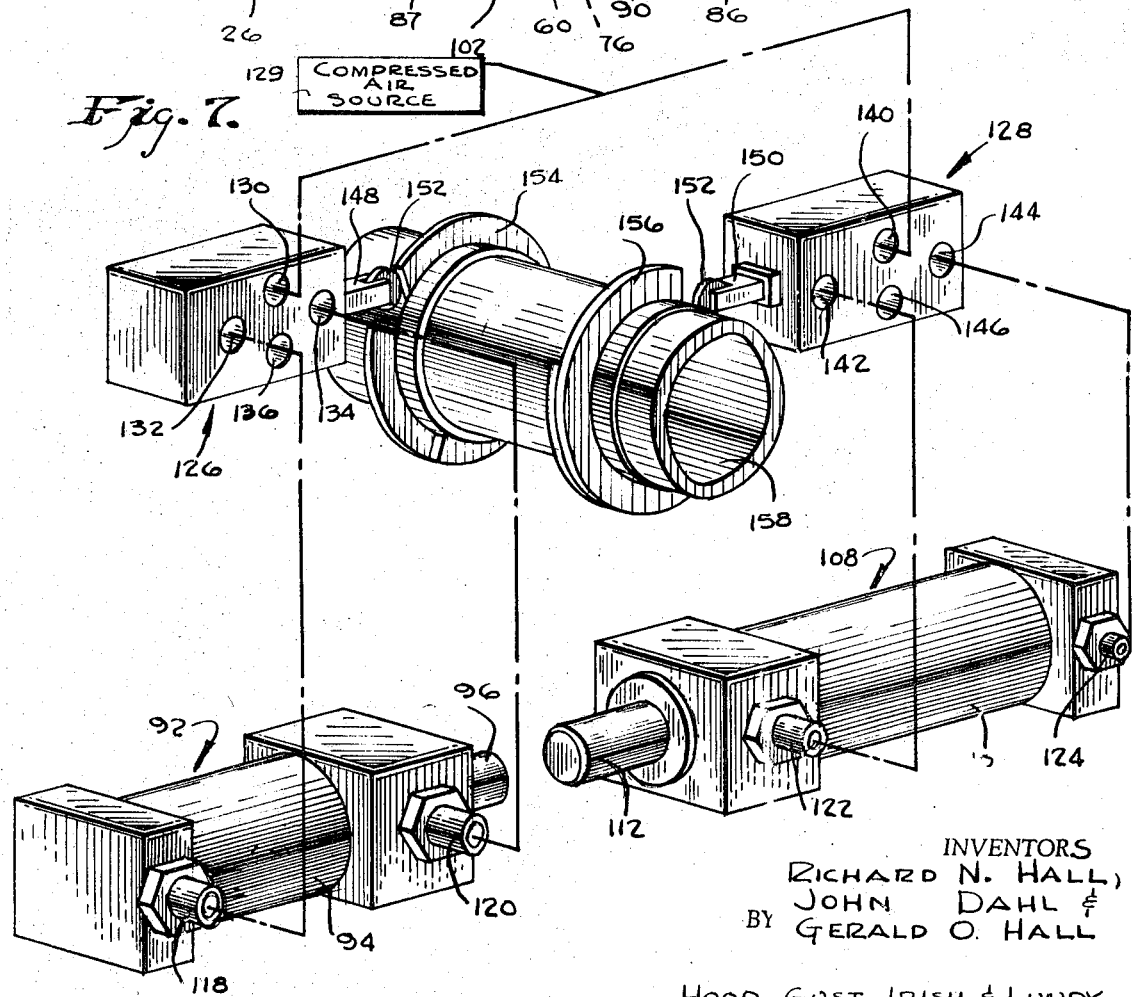
FIG. 7 is a perspective, diagrammatic view illustrating the manner in which we prefer to control the fluid motors which drive, respectively, the platform means and carriage means.

In FIG. 7, we show a compressed air source 129 connected to a pair of conventional four-way valve means 126, 128 and through these valve means, respectively, to the cylinders 94, 110. The valve means 126 is provided with an inlet port 130, delivery ports 132 and 134 and an exhaust port 136. A plunger 148, yieldably biased toward extended position, is shiftable inwardly against that bias to connect port 130 with port 132 and port 134 with port 136, while in its illustrated, extended position, it connects the port 130 with the port 134 and the port 132 with the port 136. Port 132 is connected to port 118 of cylinder 94, while port 134 is connected with port 120 of the cylinder 94. Thus, when the plunger 148 is in its extended position, air will be supplied to the right-hand end of cylinder 94 and the left-hand end of said cylinder will be exhausted, whereby the slide block 90 will be shifted to and held in its position illustrated in FIG. 5; whereas, when the plunger 148 is pressed inwardly against its bias, air will be supplied to the left-hand end of cylinder 94, the right-hand end of that cylinder will be exhausted and the slide block 90 will be shifted to, and held in, its position illustrated in FIG. 4.

Similarly, the valve means 128 is formed to provide an inlet port 140, delivery ports 142 and 144 and an exhaust port 146. A plunger 150, which is biased to its illustrated, projected position, establishes connection between ports 140 and 144 and between ports 142 and 146 when in that position; and, when the plunger is forced inwardly against its bias, connection is established between the ports 140 and 142 and between the ports 144 and 146. Port 142 is connected to port 122 of cylinder 110 and port 144 is connected to port 124 of said cylinder. Thus, when the plunger 150 is in its illustrated, extended position, air will be supplied to the right-hand end of cylinder 110, the left-hand end of that cylinder will be exhausted, and the carriage 44 will be shifted to, and held in, its position illustrated in FIG. 4. When the plunger 150 is forced inwardly, air will be supplied to the left-hand end of cylinder 110, the right-hand end of that cylinder will be exhausted, and the carriage 44 will be shifted to, and held in, its position illustrated in FIG. 5.

Rollers 152 are carried on the distal ends of plungers 148 and 150 to follow, respectively, cams 154 and 156, said cams preferably being mounted on a sleeve 158 which is adapted to be operatively supported upon the shaft 18 of a press 10 for rotation therewith. As is suggested in FIG. 1, the valve means 126, 128 may be suitably supported on the press to arrange their rollers 152 in cooperative association with the cams 154 and 156.

We prefer to control the fluid motors 92, 108 so that the platform means 58 is moved upwardly when the carriage means 44 is at one end of its travel and downwardly when the carriage means is at the opposite end of its travel. Specifically, referring to FIGS. 4 and 5, we prefer to raise the platform means 58 from its illustrated solid-line position (FIG. 5) to its illustrated broken-line position (FIG. 5) when the piston rod 112 is fully retracted and to lower the platform means from its illustrated solid-line position (FIG. 4) to its illustrated broken-line position (FIG. 4) when the piston rod 112 is fully extended; and the cams 154 and 156 will be suitably contoured and related to produce that sequence of operation.

The illustrated solid-line position of the platform means 58 in FIG. 4 corresponds to the showing of the platform means in FIG. 3. Thus, movement of the platform means downwardly deposits the workpieces 34 into the die stations 28, 30 and then the platform means 58, in its lowered position and out of engagement with the workpieces, is moved, by travel of the carriage 44, in the direction opposite to the arrow 32 (FIG. 3) to its position corresponding to the illustrated solid-line position of FIG. 5. Referring to FIG. 6, it will be seen that, when the platform means 58 is lowered from its illustrated solid-line position to its illustrated broken-line position, the workpieces 34 are deposited into the die stations 28, 30 and disengaged from the platform 58. The broken-line illustration of the workpiece 34 in FIG. 6 shows the position of a workpiece in the die station 28, 30. When the platform means 58 is again moved upwardly, at the right-hand end of the travel path of carriage 44, the workpieces 34 are engaged thereby, but in a new relationship to the platform means, and are lifted from the die stations 28, 30 to be moved forwardly to the next succeeding die station.

The entry end of the feeder 24 is the right-hand end as viewed in FIGS. 4 and 5. Workpieces are placed into the cut outs 74 adjacent the right-hand ends of the members 68, 70. When the platform means 58 is in its illustrated solid-line position of FIG. 5. Thus, movement of the platform means 58 through its four positions as described above will move the workpieces supported thereon serially through the die stations 28, 30.

When our feeder 24 is used in a press such as illustrated in FIG. 1, we arrange the cams 154, 156 and the valve means 126, 128 so that the platform means is moved through its four positions each time the ram 20 is reciprocated toward and away from the plate 14. The die stations 28, 30 will be operated to form the end portions of the workpieces 34 each time the ram 20 is so reciprocated.

The embodiment of FIGS. 8, 9 and 10 comprising the different guide means 36′ is similar in most respects to the embodiment of FIGS. 2–6. It will be seen, however, that the support assembly, comprising the support members 68, 70 and the member 72, has been omitted from FIGS. 8, 9 and 10 for clarity of illustration. Further, the fluid motor 108 is fastened directly to the plate 26 by means such as the illustrated screws 160.

We claim:

1. For use with a plurality of serially and equally spaced operating stations, means for moving a plurality of workpieces serially through such stations, said moving means comprising guide means arranged to extend alongside such stations, carriage means arranged for reciprocation along said guide means, platform means, means for mounting said platform means on said carriage means for reciprocation relative to said carriage means in a direction transverse to said guide means, first drive means arranged to reciprocate said carriage means a distance equal to the spacing between such operating stations, second drive means arranged to reciprocate said platform means, said platform means comprising means for supporting such plurality of workpieces with the spacing between such workpieces being equal to the spacing between such stations, said platform means being disposed so that, when said carriage means is at either end of its travel, each of certain of such workpieces is aligned with one of such stations, and, when said platform means is reciprocated in one direction, such workpieces are engaged thereby and moved away from such stations, and when said platform means is reciprocated in the opposite direction, such workpieces are moved thereby toward and deposited at such stations, means for controlling said second drive means to reciprocate said platform means in said one direction when said carriage means is at one end of its travel and in said opposite direction when said carriage means is at the opposite end of its travel, said second drive means comprising a rack arranged for reciprocation on said carriage means, a pinon gear meshed with said rack, means for journal mounting said pinion gear on said carriage means, and a fluid motor for driving said pinion gear, said fluid motor being mounted on said carriage means for reciprocation therewith.

2. The invention of claim 1 wherein said guide means comprises a pair of spaced apart, horizontally extending bars on which said carriage means is slidably mounted, said rack being arranged for vertical reciprocation between said bars whereby, when said first and second drive means are cycled, a point on said platform means is moved through a rectangular path.

3. For use with a conventional press comprising a ram, rotary means for driving the ram, a press table, and a plurality of serially and equally spaced die stations mounted on the table and disposed to be operated by the ram, means for moving a plurality of workpieces serially through such stations, said moving means comprising guide means arranged to extend alongside such stations, carriage means arranged for reciprocation along said guide means, platform means, means for mounting said platform means on said carriage means for reciprocation toward and away from such a table, first drive means arranged to reciprocate said carriage means a distance equal to the spacing between such operating stations, second drive means arranged to reciprocate said platform means, said platform means comprising means for supporting such a plurality of workpieces with the spacing between such workpieces being equal to the spacing between such stations, said platform means being disposed on said carriage means so that, when said carriage means is at either end of its travel, certain of such work pieces are aligned with certain of such stations, and, when said platform means is reciprocated away from such a table, such workpieces are engaged thereby and moved away from such stations, and, when said platform means is reciprocated toward such a table, such workpieces are moved thereby toward and deposited at such stations, means for controlling said second drive means to reciprocate said platform means away from such a table when said carriage means is at one end of its travel and toward such a table when said carriage means is at the opposite end of its travel, said first and second drive means comprising fluid motors and said control means comprising valve means arranged to dominate said fluid motors and cam means arranged to operate said valve means, said cam means being adapted to be mounted for rotation with such rotary means.

4. For use with a conventional press comprising a ram, rotary means for driving the ram, a press table, and a plurality of serially and equally spaced die stations mounted on the table and disposed to be operated by the ram, means for moving a plurality of workpieces serially through such stations, said moving means comprising guide means arranged to extend alongside such stations, carriage means arranged for reciprocation along said guide means, platform means, means for mounting said platform means on said carriage means for reciprocation toward and away from such a table, first drive means arranged to reciprocate said carriage means a distance equal to the spacing between such operating stations, second drive means arranged to reciprocate said platform means, said platform means comprising means for supporting such a plurality of workpieces with the spacing between such workpieces being equal to the spacing between such stations, said platform means being disposed on said carriage means so that, when said carriage means is at either end of its travel, certain of such workpieces are aligned with certain of such stations, and, when said platform means is reciprocated away from such a table, such workpieces are engaged thereby and moved away from such stations, and, when said platform means is reciprocated toward such a table, such workpieces are moved thereby toward and deposited at such stations, means for controlling said second drive means to reciprocate said platform means away from such a table when said carriage means is at one end of its travel and toward such a table when said carriage means is at the opposite end of its travel, said guide means extending generally horizontally and said platform means reciprocating generally vertically whereby, when said drive means are cycled, a point on said platform means moves through a generally rectangular path, said second drive means comprising a rack arranged for generally vertical reciprocation on said carriage means, said platform means being connected to said rack for reciprocation therewith, a pinion gear journalled on said carriage means and meshed with said rack and means for rocking said pinion gear about its axis.

5. The invention of claim 4 wherein said means for rocking said pinion gear comprises a fluid motor of the type having a reciprocable piston rod and means for connecting the piston rod to said pinion gear, said fluid motor and said connecting means being mounted on said carriage means for movement therewith.

6. In combination, a press comprising a ram, a bolster plate, means for driving said ram toward said bolster plate, and a plurality of serially and equally spaced die stations mounted on said bolster plate and disposed to be operated by movement of said ram, means for moving a plurality of workpieces serially through said die stations, said moving means comprising guide means arranged to extend alongside said die stations, carriage means arranged for reciprocation along said guide means, platform means, means for mounting said platform means on said carriage means for reciprocation toward and away from said plate, first drive means arranged to reciprocate said carriage means a distance equal to the spacing between said stations, second drive means arranged to reciprocate said platform means, said platform means comprising means for supporting such a plurality of workpieces with the spacing between such workpieces being equal to the spacing between said die stations and with a portion of each such workpiece extending outwardly from said platform means toward said die stations, said platform means being disposed on said carriage means so that, when said carriage means is at either end of its travel, each of certain of such workpieces is extended into one of said die stations, and, when said platform means is reciprocated away from said bolster plate, such workpieces are engaged thereby and moved away from said die stations, and, when said platform means is reciprocated toward said bolster plate, such workpieces are deposited into said die stations, means for controlling said second drive means to reciprocate said platform means away from said bolster plate when said carriage means is at one end of its travel and toward said bolster plate when said carriage means is at the opposite end of its travel, said ram driving means being a rotary means, said first and second drive means being fluid motors, and said control means comprising cam means mounted on said rotary means for rotation therewith, and valve means for controlling said fluid motors, said valve means being arranged to be operated by said cam means.

7. In combination, a first elongated guideway, a carriage guide for movement along said guideway, motor means having an element fixed with respect to said guideway and an element operatively connected with said carriage to drive said carriage oppositely along said guideway, said carriage being formed to provide a second guideway elongated in the direction of length of said first guideway, slide means reciprocably guided in said second guideway, second motor means having an element fixed with respect to said carriage and an element operatively connected with said slide means to drive said slide means oppositely along said second guideway, a rack mounted on said carriage for reciprocation relative to said carriage in a path angularly related to the direction of length of said guideway, a pinion carried by said carriage and journalled on an axis transverse to the path of said rack, said pinion meshing with said rack, and means operatively connecting said slide means with said pinion to turn said pinion response to reciprocation of said slide relative to said carriage.

8. The combination of claim 7 in which the means operatively connecting said slide means with said pinion comprises a lever rotationally fixed relative to said pinion and extending radially from the journal axis of said pinion, and stud means carried adjacent the distal end of said lever, said slide means providing a third guideway elongated in a direction parallel with the line of movement of said rack and operatively receiving said stud means.

9. The combination of claim 7 in which each of said motor means comprises a cylinder element and a piston element.

References Cited
UNITED STATES PATENTS
3,135,395   6/1964   Wallis _____ 214—1
1,896,692   2/1933   Berger _____ 72—420

CHARLES W. LANHAM, Primary Examiner

MICHAEL J. KEENAN, Assistant Examiner

U.S. Cl. X.R.

72—428; 214—1